United States Patent [19]
Watts et al.

[11] 3,807,764
[45] Apr. 30, 1974

[54] ANTI-JACKKNIFING DEVICE

[76] Inventors: Jess L. Watts, 10027 Schuessler Rd., St. Louis, Mo. 63128; James H. Link, 712 S. Broadway, St. Louis, Mo. 63102

[22] Filed: Feb. 1, 1973

[21] Appl. No.: 328,522

[52] U.S. Cl. ............................ 280/432, 280/446 B
[51] Int. Cl. .............................................. B60d 7/00
[58] Field of Search ............ 280/432, 446 B, 446 R

[56] References Cited
UNITED STATES PATENTS

| | | | |
|---|---|---|---|
| 2,201,353 | 5/1940 | Soulis | 280/432 |
| 2,564,592 | 8/1951 | Bishop | 280/432 |
| 3,231,295 | 1/1966 | Till | 280/432 |
| 3,635,496 | 1/1972 | Hedgepeth | 280/446 B |
| 3,722,919 | 3/1973 | Herbert | 280/432 |
| 3,420,548 | 1/1969 | Wakeman | 280/432 |

FOREIGN PATENTS OR APPLICATIONS

| | | | |
|---|---|---|---|
| 1,012,530 | 7/1957 | Germany | 280/432 |

*Primary Examiner*—Leo Friaglia
*Attorney, Agent, or Firm*—F. Travers Burgess

[57] ABSTRACT

An anti-jackknifing device for road vehicle motor and trailer sets comprises a normally released vertical axis element on one of the vehicles having a rotatable arm, and a link connecting the arm to a point on the other vehicle spaced from the pivot axis of the motor to trailer coupling. The braking member is preferably actuated responsive to vehicle brake application, and to manual actuation to prevent pivotal movements of the motor and trailer vehicles with respect to each other.

12 Claims, 6 Drawing Figures

PATENTED APR 30 1974 3,807,764

ANTI-JACKKNIFING DEVICE

BACKGROUND OF THE INVENTION

1. Field of the Invention

The invention relates to articulated road vehicles and consists particularly in an anti-jackknifing device for motor and trailer combination vehicles.

2. The Prior Art

Various attempts have been made to prevent jackknifing by articulated highway vehicles, such as the provision of stop lugs for limiting relative movement of the units forming such vehicles. Such means have generally been unsuccessful.

SUMMARY OF THE INVENTION

The invention provides a simple relatively inexpensive yet reliable and effective means for preventing jackknifing between a highway motor and trail vehicle coupled to each other. Objects of the invention include the provision of such means which are normally inoperative except during brake applications so as not to interfere with normal turning movements, and the provision for making it selectively operable, under the driver's control whenever he judges jackknifing to be imminent.

DETAILED DESCRIPTION OF THE INVENTION

Figure 1:
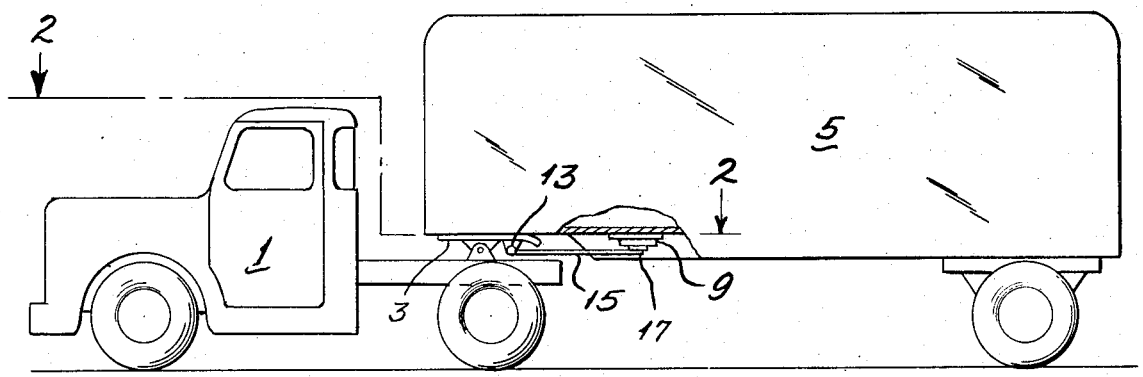
FIG. 1 is a side elevational view of a tractor-semitrailer combination vehicle, partly broken away to show a device embodying the invention.
Figure 2:
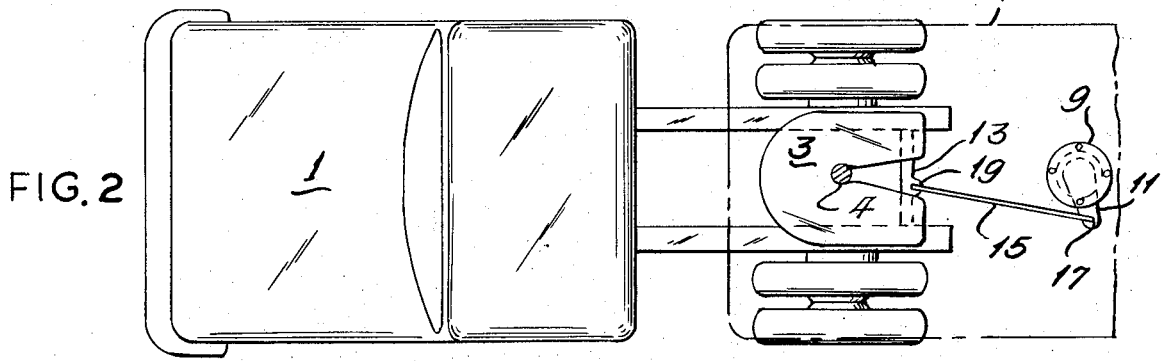
FIG. 2 is a fragmentary plan view of the vehicle of FIG. 1, with the trailer body deleted to show the invention.

In FIGS. 1 and 2 a motor vehicle comprising highway tractor 1 is coupled by means of a conventional fifth wheel 3 to a semitrailer vehicle 5, such that the forward end of the body of semitrailer vehicle 5 rests on tractor fifth wheel 3 and is freely pivoted thereon about the vertical axis of its kingpin 4 to provide articulation of the two vehicles for operation around curves.

While such vehicle combinations have numerous well-known advantages, one serious disadvantage of their articulation is the possibility of their jackknifing; i.e., exceeding their normal maximum angle of connection to each other, which is about 94° such that in some instances the trailer crushes or shears off the tractor cab with serious injury and frequently death to the driver and other occupants of the cab, in addition to property damage to both the tractor and the semitrailer.

To prevent jackknifing, a brake device 9 is secured to the underframe of semitrailer vehicle 5 a substantial distance rearwardly of the pivot center of fifth wheel 3, and mounts a normally rotatable arm 11 extending generally transversely of the vehicle, preferably at an angle of about 15° rearwardly from the transverse diameter of brake device 9. Fifth wheel 3 underlyingly mounts a transverse shaft 13 near its rear margin sufficiently spaced below its top surface to clear the trailer kingpin 4 during coupling and uncoupling operations. A generally longitudinally extending link 15 is pivotally connected at its rear end at 17 to brake device arm 11 and at its forward end at 19 to shaft 13, the location of pivots 17 and 19 being such that they and kingpin 4 are aligned when the coupled vehicles are aligned with each other.

During normal operation, with brake device 9 deenergized, arm 11 is free to turn, thus freely permitting correspondingly free movements of link 15 and relative pivotal movements of tractor 1 and semitrailer 5 about kingpin 4. Upon energization of brake device 9 however, arm 11 is held against rotary movement, and any tendency of the tractor and semitrailer to pivot relative to each other in either direction and eventually jackknife will apply tension to link 15 which, by its resistance to tension, will oppose any such tendency and thus prevent jackknifing.

For actuating brake device 9, it is preferably connected by means comprising line 21 to the tractor brake system, which comprises a tractor-mounted compressor 25 and reservoir 25a connected to service line 26 and control line 27. Service line 26 is connected to trailer service line 28 by hose connection 29, and trailer service line 28 supplies trailer-mounted antijackknifing reservoir or tank 30 with air, through line 28a including filter 28b. The outlet of tank 30 is connected to the control side of relay valve 32 via line 33 and the output of relay valve 32 is connected to quick-release valve 34 via line 35. Line 21 leads from quick-release valve 34 to antijackknifing braking element 9 so that when relay valve 32 is energized air will flow from tank 30 through relay valve 32 to energize braking element 9. For operating relay valve 32, control line 27 includes the usual pedal-operated brake valve 36 and hand valve 36a, and is connected via hose 37 to trailer control line 38. The latter is operatively connected to the control side of relay valve 32 via line 38a, including pressure-responsive check valve 38b, so as to cause relay valve 32 to open when brake valve 36 is actuated and pressure in line 38a reaches the value at which check valve 38b is calibrated, thereby causing air to pass from tank 30 through lines 33, 35 and 21 to braking element 9, thus immobilizing arm 11, which will act to prevent jackknifing as described above when the brakes are applied.

To permit operating of the antijackknifing device at other times independently of the brake system when in the judgment of the driver it is desirable so to do, tank 30 is connected by bypass line 39 including normally-closed solenoid valve 39a to line 38a posterior to check valve 38b. Solenoid 39b is operatively connected to valve 39a to open the same when energized. The solenoid circuit 40 includes battery 40a and manual control means in the form of normally-open switch 40b so that, upon manual closure of switch 40b, solenoid 39b is energized, opening valve 39a and thereby causing air passing from tank 30 via lines 39 and 38a to open relay valve 32 and permit the passage of air therethrough from tank 30 to antijackknifing brake element 9 so as to immobilize arm 11, which will act as described above to prevent jackknifing whenever the driver closes switch 40b.

Figure 4:
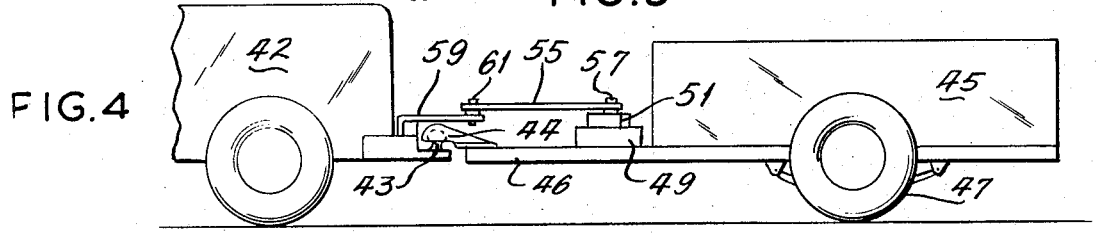
FIG. 4 is a partial side elevational view of a motor vehicle and full trailer coupled to each other, showing application of the invention.
Figures 5, 6:
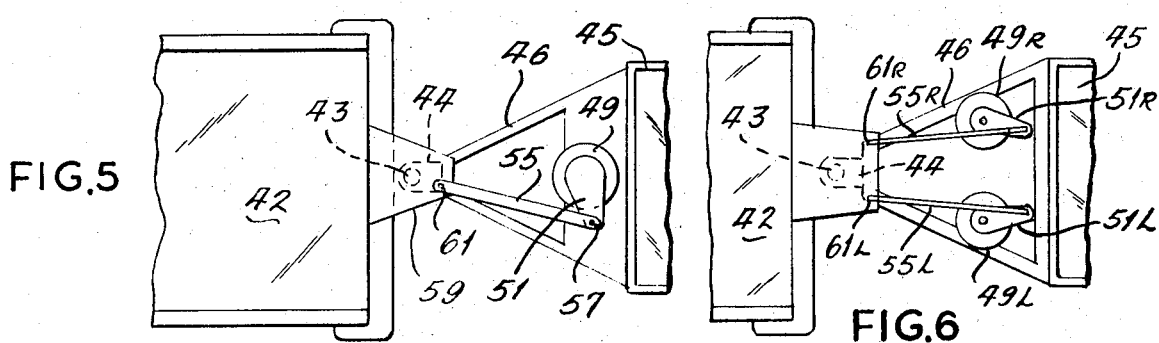
FIG. 5 is a partial plan view of the arrangement shown in FIG. 4.
FIG. 6 is a partial plan view of a modified form of the arrangement of FIGS. 4 and 5.

Application of the antijackknifing device to a vehicle combination of the type in which the trail vehicle is a separate trailer 45 principally supported on its own wheels 47 is shown in FIGS. 4 and 5, in which the numeral 42 indicates a truck, mounting on its rear end a ball-type coupling 43, to which is pivotally secured the socket-type coupling 44 mounted on the forward end of V-frame 46 of trailer 45.

Figure 3:
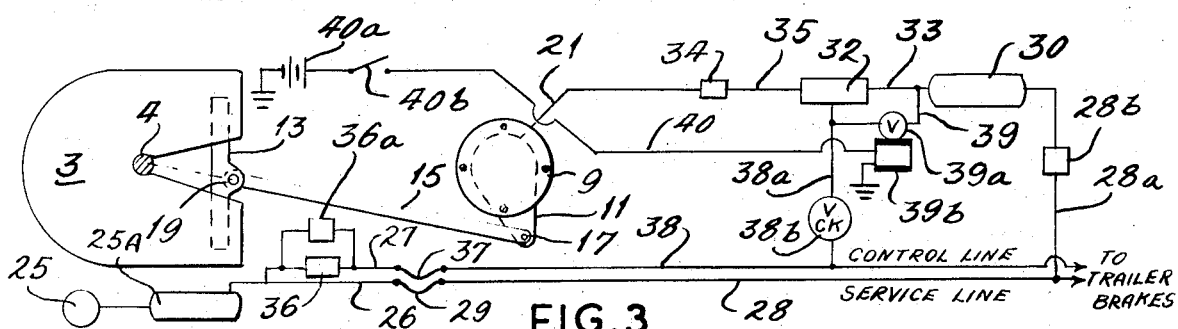
FIG. 3 is a schematic view of the pneumatic control of the device illustrated in FIGS. 1 and 2.

The antijackknifing device of FIGS. 4 and 5 is generally similar to that of FIGS. 1–3, comprising a brake element 49 fixedly mounted on trailer V-frame 46, an arm 51 rotatably mounted on brake element 49 and a generally longitudinal link 55 pivotally connected at its rear end at 57 to arm 51. Truck 42 is provided at its rear end with a rearwardly extending horizontal plate-like bracket 59 overlying coupling 43, 44 and vertically clearing the same, and the forward end of link 55 is pivotally connected at 61, rearwardly of coupling 43, 44, to bracket 59, pivots 57 and 61 being aligned with coupling 43, 44 when the truck and trailer are aligned with each other.

Operation of the antijackknifing device illustrated in FIGS. 4 and 5 is substantially the same as that of the embodiment of FIGS. 1–3.

In FIG. 6, a pair of antijackknifing devices are provided in side-by-side relation where greater resistance is required. The devices are similar to that of FIGS. 4 and 5 and the reference numerals are followed by the letters L and R to distinguish the left and right devices. To prevent interference between the two devices on sharp turns, the arms 51L and 51R normally extend rearwardly from brake elements 49L and 49R and are approximately 15° inboard from the longitudinal diameter of the respective brake elements, links 55L and 55R then being nearly parallel.

The invention may be modified in various respects as will occur to those skilled in the art and the exclusive use of all modifications as come within the scope of the appended claims is contemplated.

We claim:

1. In a motor and trailer vehicle combination comprising a motor vehicle and a trail vehicle, means coupling said vehicles to each other for relative pivotal movements in the horizontal plane, an antijackknifing device comprising a vertical axis braking element mounted on one of said vehicles and having a rotatable generally horizontal arm and a generally longitudinally extending link pivotally connected at its one end to said arm and at its other end to said other vehicle at a point spaced from the axis of said coupling means.

2. In a vehicle combination according to claim 1 having vehicle brakes, means for selectively actuating said vehicle brakes, means responsive to said selective brake-actuating means for energizing said antijackknifing braking element.

3. In a vehicle combination according to claim 1, means for selectively energizing said antijackknifing braking element.

4. In a vehicle combination according to claim 2, means independent of said selective brake-actuating means for selectively energizing said antijackknifing braking element.

5. In a vehicle combination according to claim 1, said motor vehicle comprising a tractor and said trail vehicle comprising a semitrailer pivotally supported on the rear portion of said tractor for pivotal movement with respect thereto about a vertical axis, said brake element being mounted on the underside of said semitrailer.

6. In a vehicle combination according to claim 5, said coupling means comprising a fifth wheel on said tractor and a kingpin on said trailer, said fifth wheel having means forming the pivotal connection of said link to said tractor.

7. In a vehicle combination according to claim 6, said pivotal-connection-forming means being a transverse shaft mounted on the underside of said fifth wheel rearwardly of said kingpin.

8. In a vehicle combination according to claim 1, said trail vehicle being a separate trailer.

9. In a vehicle combination according to claim 8, said trailer having a rigid forwardly extending frame portion, said coupling comprising mating pivot members on the forward end of said frame portion and the rear end of said motor vehicle, said brake element being mounted on said frame portion and said motor vehicle having a bracket containing said pivotal connection of said link to said motor vehicle.

10. In a vehicle combination according to claim 8, a single said braking element on said trailer substantially centered transversely thereof.

11. In a vehicle combination according to claim 8, a pair of said antijackknifing devices in side-by-side relation with each other.

12. In a vehicle combination according to claim 11, said braking element arms extending generally rearwardly from said braking elements and said links being nearly parallel when said motor vehicle and trailer are aligned with each other.

* * * * *